Figure 1:
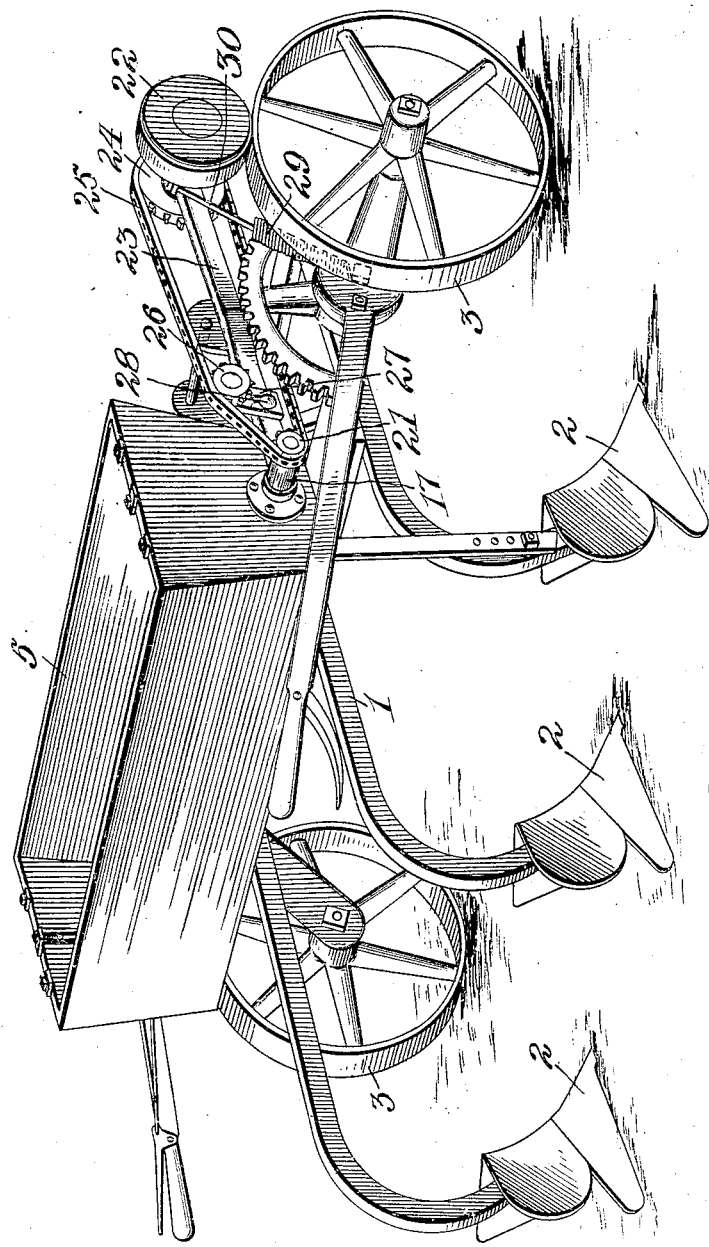

No. 875,539. PATENTED DEC. 31, 1907.
O. T. LITTLE.
FERTILIZER DISTRIBUTER.
APPLICATION FILED SEPT. 18, 1907.
2 SHEETS—SHEET 1.

Witnesses
C. H. Walker
James F. Crown

Inventor
O. T. Little
By
Sturtevant & Mason
Attorneys

No. 875,539. PATENTED DEC. 31, 1907.
O. T. LITTLE.
FERTILIZER DISTRIBUTER.
APPLICATION FILED SEPT. 18, 1907.
2 SHEETS—SHEET 2.
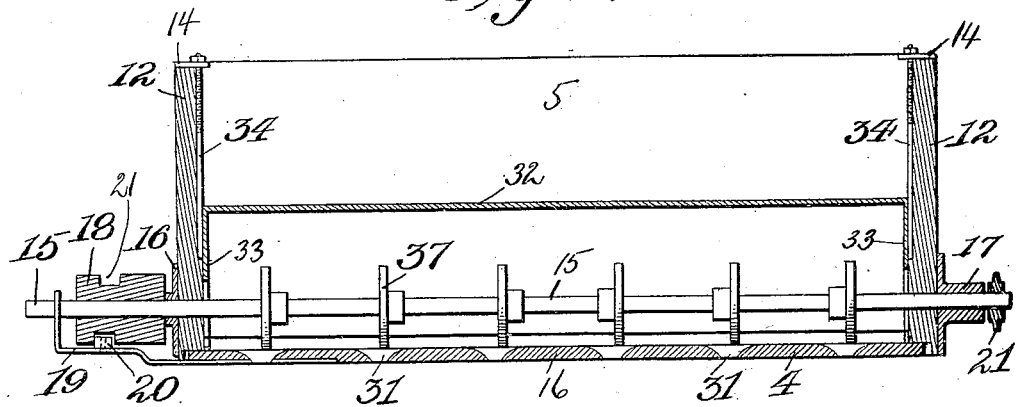
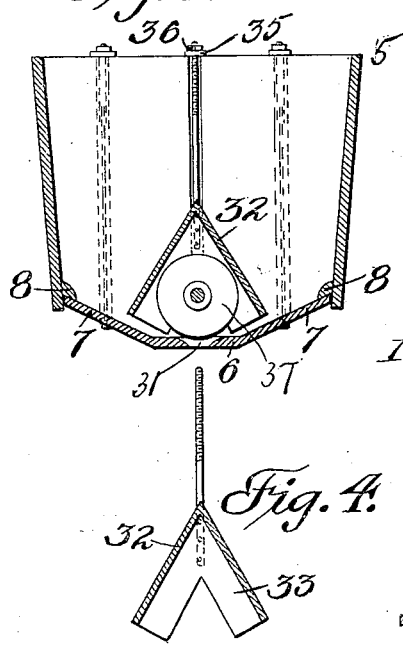
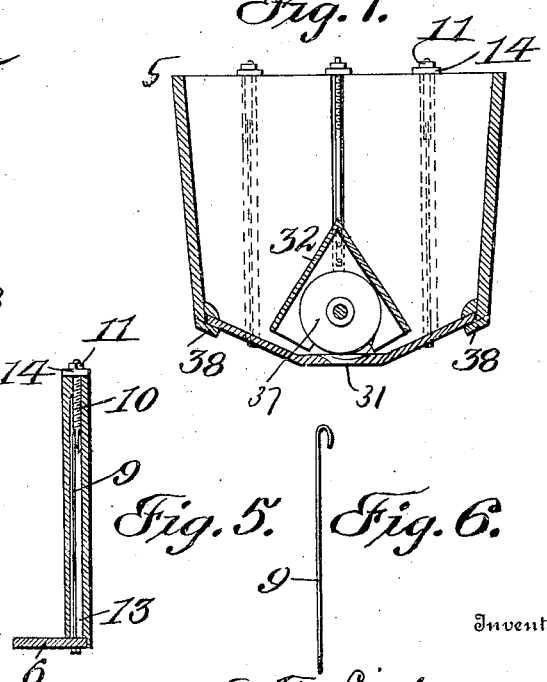
Witnesses
C. H. Walker
James F. Crown
Inventor
O. T. Little
By
Sturtevant & Mason
Attorneys

UNITED STATES PATENT OFFICE.

ORA T. LITTLE, OF RIPLEY, NEW YORK.

FERTILIZER-DISTRIBUTER.

No. 875,539.  Specification of Letters Patent.  Patented Dec. 31, 1907.

Application filed September 18, 1907. Serial No. 393,469.

*To all whom it may concern:*

Be it known that I, ORA T. LITTLE, a citizen of the United States, residing at Ripley, in the county of Chautauqua, State of New York, have invented certain new and useful Improvements in Fertilizer-Distributers, of which the following is a description, reference being had to the accompanying drawing and to the letters and figures of reference marked thereon.

My invention relates to new and useful improvements in fertilizer distributers and has for its object to provide a device which will distribute the fertilizer evenly.

My device is especially adapted for use in connection with gang plows and is so located relative to said plows as to distribute an even layer of fertilizer on the ground in front of the plow, subsequently to the turning over of the ground, so that the fertilizer is properly distributed and covered. It will be obvious however, that from certain aspects of my invention, the distributing device for the fertilizer may be located in the rear of the plows, or may be used in connection with any other form of implement. It will also be obvious, that from certain aspects of my invention, the device may be used for distributing other things than fertilizer.

In the accompanying drawings which show by way of illustration one embodiment of my invention: Figure 1 is a perspective view showing a gang plow with my distributing device attached thereto. Fig. 2 is a longitudinal sectional view through the hopper. Fig. 3 is a transverse sectional view through the hopper. Fig. 4 is a sectional detail view showing the controlling devices for the fertilizer. Fig. 5 is a sectional detail view showing the manner of supporting the bottom of the hopper so that the same may be vibrated. Fig. 6 is a detail view of one of the supporting rods. Fig. 7 is a transverse sectional view of a slightly modified form of hopper.

The gang plow 1 is of the usual construction. The framework thereof, is carried on running wheels 3 and from said framework are supported plows 2, 2, 2. Inasmuch as the gang plow forms no particular part of the present invention, further description thereof is not thought necessary.

As a supporting and conveying means for the fertilizer, I have provided a hopper 5, which as shown in Figs. 2 and 3 is provided with a bottom 6, having a central horizontal portion and inclined side portions 7, 7. The sides of the hopper near the bottom edges thereof, are provided with cleats 8, 8, and the bottom 6 is held closely against said cleats. As a means for supporting the bottom 6, so that the same may be vibrated, I have provided flexible supporting rods 9, see Figs. 5 and 6. Said rods 9, extend through the bottom 6, and are provided with a nut at the lower end. The rod 9, at the upper end is formed into a hook, which engages the eye or bolt 10, which is threaded and carries a nut 11 at its upper end.

The end portions 12 of the hopper, are recessed as at 13, see Fig. 5, and the rod 9 and bolt 10 are located in said recess 13. The nut 11 engages a wear plate 14. The bottom 6 is supported by four rods 9 connected to each of the four bolts 10.

It will be obvious that the bottom portion 6 of the hopper carried by the rods 9, may swing endwise or longitudinally relative to the hopper. As a means for swinging or vibrating the bottom 6, I have provided a shaft 15, which extends through the hopper and is mounted in suitable bearings 16, 17, carried by the hopper. Said shaft 15, carries a cam 18. An arm 19 is suitably secured to the under side of the bottom portion 6 of the hopper and at its outer end is upturned and formed with an opening which extends over the end of the shaft 15. This connection between the arm 19 and the shaft 15 serves as a means for steadying the arm 19. On the arm 19 is mounted a roller 20, which engages a cam groove 21 formed in the cam 18. As the shaft 15 rotates, the cam 18 will therefore, through the roller 20 and the arm 19, cause the bottom portion of the hopper 6 to be moved longitudinally. The shaft 15 at its opposite end carries a sprocket wheel 21. As a means for operating the sprocket wheel 21, I have provided a friction wheel 22 which is mounted in a bearing in the outer end of the arm 23, which is mounted on the bearing 17. The friction wheel 22 is carried by one end of a short shaft extending through the arm 23 which carries a sprocket wheel 24.

A sprocket chain 25 or other suitable belt passes over the sprocket wheels 21 and 24. An idler 26 is carried by an adjustable arm 27, which is secured to the arm 23 by a bolt and slot 28. The idler 26 engages the sprocket chain 25, and serves as a belt tightener. The arm 23 which is pivotally mounted on the bearing 17 is free to swing around the same and the weight of the parts carried by said arm holds the friction wheel 22 in contact with the driving wheel 3 of the gang plow.

As an additional means for holding the friction wheel in contact with the driving wheel, I have provided a spring 29 which is secured at one end by means of a rod 30 to the arm 23 and is secured at its other end to a portion of the supporting frame of the gang plow. It will be seen that said spring exerts a pull upon the arm 23 and thus holds the friction wheel 22 firmly in driving contact with the driving wheel 3.

It will be obvious that from certain aspects of my invention, other means from that herein described, may be used for driving the shaft which vibrates the bottom portion of the hopper.

The bottom 6 is provided with a series of openings 31 which are preferably shaped so as to taper towards the outer surface of the bottom. These openings in the bottom 6, serve as a means through which the fertilizer is distributed.

As a means for controlling the outflow of the fertilizer through the openings 31, I have provided an auxiliary support 32 for the fertilizer. Said auxiliary support as clearly shown in Figs. 3 and 4, is V-shaped in cross section and extends the whole length of the hopper (see Fig. 2). Said auxiliary support is provided with end pieces 33, which lie close to the end portions 12 of the hopper. As a means for supporting the auxiliary support for the fertilizer 32, I have provided the threaded rods 34, which are located in grooves formed in the end walls 12, 12 of the hopper and are secured at one end to the auxiliary support 32, while the opposite ends of the thread rods 34 extend through wear plates 35, mounted on the upper edge of the hopper and nuts 36 serve as a means for raising and lowering the auxiliary support. Said auxiliary support as clearly shown in Fig. 3 terminates a short distance from the bottom 6, and the fertilizer which is located in the hopper gradually leads under the lower edge of the auxiliary support 32 and finds its way out of the openings 31 in the bottom 6 which is constantly under vibration. The auxiliary support 32 carries the weight of the mass of the fertilizer and allows the same to be fed gradually to the openings in the vibrating bottom.

As an auxiliary means for stirring the fertilizer and assisting in the feed, I have provided the disks 37, which are mounted on the shaft 15 and rotated therewith. There is a disk 37 located adjacent each opening 31 in the bottom 6. From certain aspects of my invention however, the disks are an unnecessary element and may be omitted.

In the operation of my device, it will be apparent from the above description, the hopper 5 is filled with the fertilizer and as the machine stands at rest, the mass of fertilizer is supported by the auxiliary support 32, together with the bottom 6, which of course is not in operation and no fertilizer will be fed to the openings in the bottom. As soon however, as the implement is put into motion, the driving wheel 3 is turned and the friction wheel 22, will cause the shaft 15 to rotate. As the shaft 15 rotates, the bottom portion 6 of the hopper, will be vibrated back and forth and the fertilizer will pass through the openings 31.

It will be noted that in my device, there are no valves which are opened and closed, and therefore, I am enabled to spread evenly, the fertilizer upon the ground instead of leaving the same in drills or in little piles as is usually done where the feed is intermittent.

I have found that there are great advantages resulting from the even distribution of the fertilizer, for the reason of the fact that the entire surface of the ground is practically covered with a thin sprinkling of the fertilizer.

When it is desired to increase the amount of fertilizer distributed, the auxiliary support 32 is slightly raised so that the space between the said support and the bottom is increased and a greater amount of fertilizer will then pass through to the openings 31.

I have also found that by making the openings in the bottom 32 tapered in form and by vibrating said bottom which is so arranged that there is no obstruction whatever to the fertilizer after passing through the openings in the bottom, I am thereby enabled to distribute the fertilizer much more evenly.

In Fig. 7 of the drawing, I have provided the hopper with cleats or supports 38 which are carried by the side portions of the hopper and extend underneath the bottom 6 and serve as an auxiliary supporting means for said bottom portion.

Having thus particularly described my invention, what I claim as new and desire to secure by Letters Patent is:—

1. A fertilizer distributer including in combination a hopper, a vibrating bottom having openings therein, and means located within and centrally of the hopper for controlling the amount of the fertilizer fed through said openings.

2. A fertilizer distributer including in combination a hopper, a vibrating bottom having openings therein, means located within and centrally of the hopper for controlling the amount of the fertilizer fed through said openings, and devices for controlling the position of said feed adjusting means.

3. A fertilizer distributer including in combination a hopper, a movable bottom carried thereby, and having openings therein, means for vibrating said bottom, auxiliary supporting means for the fertilizer located within and centrally of said hopper and spaced from said movable bottom, for controlling the amount of fertilizer fed through said openings.

4. A fertilizer distributer including in combination a hopper, a movable bottom carried thereby and having openings therein, means for vibrating said bottom, auxiliary supporting means for the fertilizer located within and centrally of said hopper and spaced from said movable bottom for controlling the amount of fertilizer fed through said openings, and means for adjusting the position of the auxiliary supporting means toward and from said movable bottom.

5. A fertilizer distributer including in combination a hopper, a bottom having openings therein, means for suspending the bottom, means for vibrating the bottom and means located within and centrally of the hopper for controlling the amount of the fertilizer fed through said openings.

6. The combination with a ground working implement, supporting wheels therefor, a fertilizer distributer carried by said implement including a hopper, vibrating means for feeding the fertilizer from said hopper and a friction wheel engaging one of said supporting wheels for operating said vibrating means and an adjustable device located within and centrally of the hopper for controlling the amount of fertilizer fed by said vibrating means.

7. The combination of a gang plow, supporting wheels therefor, a hopper carried thereby, a shaft located in said hopper, feeding mechanism for the fertilizer controlled by said shaft, an arm pivoted to swing about the axis of said shaft, a sprocket wheel carried by said arm, a friction disk carried by said arm and secured to said sprocket wheel, a sprocket wheel carried by said shaft, a sprocket chain for gearing the first named sprocket wheel to the sprocket wheel carried by the shaft and a spring for holding the friction wheel in engagement with one of the supporting wheels, of said plow.

8. A fertilizer distributer including a hopper, a shaft located in said hopper, a movable bottom carried by said hopper and having openings therein, a cam on said shaft, means operated by said cam for vibrating said bottom, auxiliary supporting means for the fertilizer within said hopper.

9. A fertilizer distributer including a hopper, a shaft located in said hopper, a movable bottom carried by said hopper and having openings therein, a cam on said shaft, means operated by said cam for vibrating said bottom, and auxiliary supporting means for the fertilizer within said hopper, and means for adjusting the position of the auxiliary supporting device.

10. A fertilizer distributer including a hopper, a shaft located in said hopper, a movable bottom carried by said hopper and having openings therein, a cam on said shaft, means operated by said cam for vibrating said bottom and auxiliary supporting means for the fertilizer within said hopper, disks carried by said shaft and located between said auxiliary supporting means and said bottom.

In testimony whereof I affix my signature, in presence of two witnesses.

ORA T. LITTLE.

Witnesses:
P. L. HAWKINS,
E. E. LA DUC.